United States Patent [19]

Devaud

[11] Patent Number: 4,895,351
[45] Date of Patent: Jan. 23, 1990

[54] TENSION-COMPRESSION STAY WITH FIBER-REINFORCED SYNTHETIC RESIN MATERIAL STRUT

[75] Inventor: Jean-Michel Devaud, Muttenz, Switzerland

[73] Assignee: Ciba-Geigy Corporation, Ardsley, N.Y.

[21] Appl. No.: 803,681

[22] Filed: Dec. 2, 1985

[30] Foreign Application Priority Data

Dec. 11, 1984 [CH] Switzerland .......................... 5873/84

[51] Int. Cl.$^4$ ................................................ F16F 1/00
[52] U.S. Cl. ........................................ 267/69; 267/70; 403/11; 464/181
[58] Field of Search .................. 267/69, 70, 148, 149; 464/180, 181; 403/368, 11, 320

[56] References Cited

U.S. PATENT DOCUMENTS

4,050,827  9/1977  Jonda ...................................... 403/11
4,097,163  6/1978  Dubuque ............................. 403/320
4,421,497  12/1983  Federmann et al. ................. 464/181

FOREIGN PATENT DOCUMENTS

59163  2/1982  European Pat. Off. .
3007896  9/1981  Fed. Rep. of Germany .
2496836  6/1982  France .

*Primary Examiner*—Andres Kashnikow
*Assistant Examiner*—Matthew C. Graham
*Attorney, Agent, or Firm*—Harry Falber

[57] ABSTRACT

Metallic force-introducing elements are fastened to the two ends of a fiber-reinforced synthetic resin material tube. These elements consist each of an inner and an outer part which are screw-connected with one another. The inner part comprises a bushing-shaped thread-bearing shaft having an external threading and being screwed into the respective tube end. The outer part comprises a supporting sleeve which surrounds the tube end and absorbs radial forces generated by the thread-bearing shaft. This type of connection of a synthetic resin tube with force-introducing elements is not critical with respect to temperature changes and is particularly simple to assemble in the manufacture of a novel tension-compression stay.

20 Claims, 1 Drawing Sheet

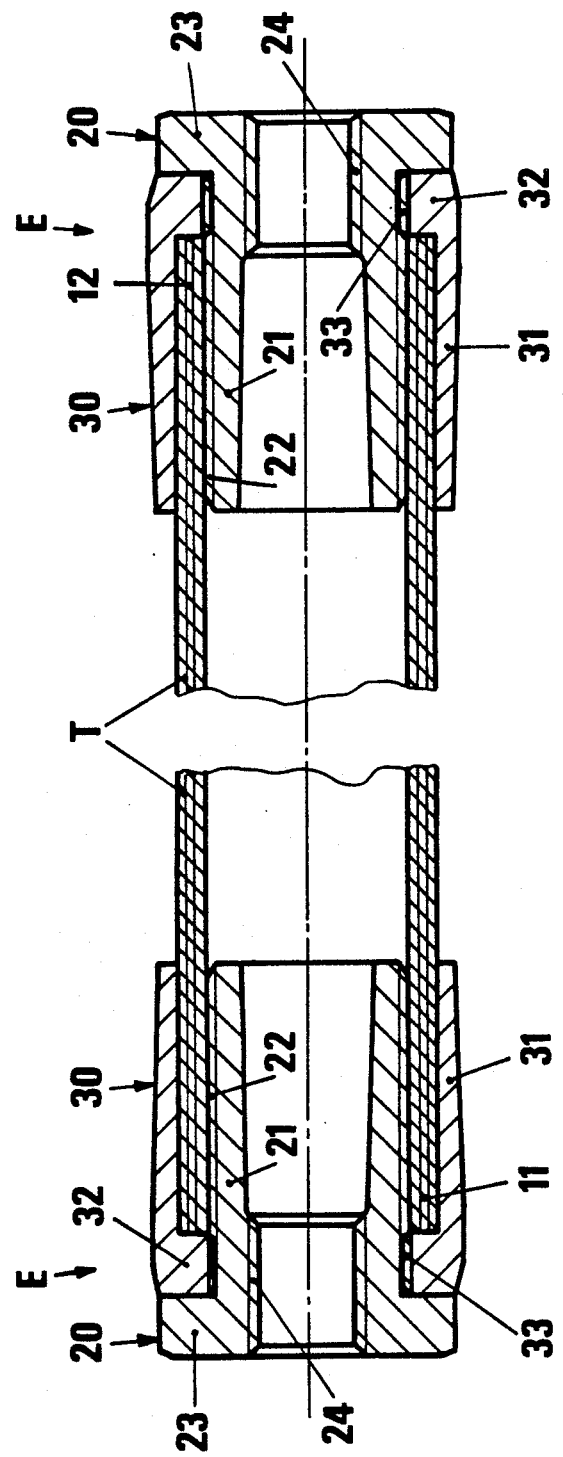

4,895,351

TENSION-COMPRESSION STAY WITH FIBER-REINFORCED SYNTHETIC RESIN MATERIAL STRUT

BACKGROUND OF THE INVENTION

This invention relates to a tension-compression stay comprising a synthetic resin tubular strut reinforced by fibers of high rigidity and force-introducing elements of metal fastened to the ends of the strut.

Such composite stays are used in all those situations in which high supporting capacity as well as a low weight are demanded simultaneously of the stay, as is, for instance, the case in the construction of aircraft or the like.

Hitherto known stays of this kind often consist of a cylindrical strut of fiber- reinforced synthetic resin material at each end of which there is fastened a force-introducing element in the shape of a metal bell having a lug formed thereon. The metal bell and the tube end each have mutually fitting tapered ends with conical fitting surfaces generated by the beveling treatment, which surfaces are glued together.

In these known stays, there are thus glued directly together two materials of such different kind as fiber-reinforced synthetic resin and metal. This may cause undesirable tensions in the glued region which considerably decrease the resistivity of the connection. Moreover, such conventional stays are still relatively heavy.

In another known kind of tension-compression stays the metallic force-introducing elements are integrated in the synthetic resin material tube, i.e., they are already built into the fiber structure and anchored therein when the tube is being produced. This known construction is of relatively expensive production and is moreover of the same critical nature vis-a-vis temperature changes as the type of stay described hereinbefore.

In the European patent application No. 0,149,979, of earlier priority, which corresponds to U.S. patent application Ser. No. 689,527 filed Jan. 7, 1985, there is disclosed stay which is improved over the previously described stays, and comprises a synthetic resin tube reinforced by carbon or aramide fibers and having bottle neck-like reduced diameter ends in each of which there is glued a hollow cylindrical pin having approximately the same properties of mechanical resistance and thermal elongation as the tube material, while eyebolt-shaped force-introducing elements of metal are screwed into the two pins. This mode of construction avoids or reduces undesirable tensions in the region of force-introduction.

Further embodiments of stays and shafts having fiber-reinforced tubular elements are described, for instance, in U.S. Pat. Nos. 4,050,827, 4,358,284, 4,421,497 and 4,433,933 as well as in European patent application No. 59,163, to which U.S. patent application Ser. No. 347.403 filed Oct. 2nd, 1982 corresponds, and French patent application No. 2,496,836.

OBJECT AND SUMMARY OF THE INVENTION

It is an object of the invention to provide a tension-compression stay which is of simpler construction and hence less complicated to manufacture than the above-described known stay and comprises force-introducing means which are, in particular, free from problems due to changes in temperature.

This object as well as others that will become apparent in the further description of the invention are obtained by a tension-compression stay of the initially described type which is provided, in accordance with the invention, with force-introducing elements, which comprise metallic shafts provided with an external threading and are screwed, by means of the latter, into the ends of the synthetic resin material tube.

Preferred embodiments of this stay according to the invention comprise at least one of the following advantageous features:

the threaded shaft or its external threading is devised with a slight conical taper; or both are so tapered;

the threaded shaft is so dimensioned that the force-transfer is achieved essentially by force-locking connection, e.g. by friction;

the force-introducing elements comprise at each end of the synthetic resin tube a supporting sleeve which is firmly seated thereon;

the supporting sleeves comprise each a radially inwardly projecting flange provided with an internal threading, which flange is screw-connected with the threaded shaft;

the supporting sleeves are seated with radial or circumferential tensioning on the ends of the synthetic resin tube;

the threaded shafts are shaped as bushings and provided with an internal threading;

the supporting sleeves are connected with the associated threaded shafts mechanically or by gluing.

Similar constructions have been widely used in couplings for elastic hoses made from synthetic resin material. However, the fastening of the coupling elements in such cases is based on the form-locking effect enforced by the elastic resilience of the hose. No such hose is here provided for.

In the German Offenlegungsschrift No. 30 07 896, there is described connecting means for the abutting ends of synthetic resin tubes wherein a metallic force-connecting element is provided with a longitudinally directed circumferential gearing and so pressed onto or into the fiber-synthetic resin tube that the connecting element is in a form-locking engagement, in the sense of rotation, with the fiber-synthetic resin tube. This known connecting means is exclusively destined for use with torque shafts, but not for tension-compression stays and, indeed, it is not suited for the latter.

BRIEF DESCRIPTION OF THE DRAWING

A preferred, but non-limitative embodiment of the tension-compression two-force stay according to the invention is described in detail in the sole figure of the drawing which shows such embodiment in an axial sectional view.

DETAILED DESCRIPTION OF THE ILLUSTRATED EMBODIMENT

The illustrated stay comprises a synthetic resin tube T reinforced by, for instance, carbon or aramide fiber, and two force-introducing elements E which are fastened each to one of the ends 11 and 12, respectively, of the tube T. These two force-introducing elements are of equal design and, therefore, bear hereinafter the same reference numerals.

Each force-introducing or -applying element E consists of an inner part 20 and an outer part 30. The inner part 20 consists of a bushing- or shell-shaped thread-bearing shaft 21 having an external thread 22 and comprising a radially outwardly protruding flange 23 having an internal threading 24. The outer part 30 consists of a supporting sleeve 31 and a radially inwardly projecting flange 32 having an internal threading 33.

The supporting sleeve 31 is firmly seated, optionally with pre-tensioning on the end 11 or 12, respectively, of the synthetic resin tube T. The inner part 20 of the force-introducing element E is provided with a threaded shaft 21 by means of which it is screwed directly into the tube end 11 or 12, respectively. This screw-connection thus produces a strong force-locking effect, subject to an appropriate mutual adjustment of the diameters of the tube and the shaft, between the wall of the tube and the threaded shaft 21, whereby a safe introduction of force is guaranteed. On account of this force-locking effect, not only longitudinal forces, but up to certain limits also torques can be transferred to the stay.

In order to increase the force-locking effect as well as to facilitate assembly, the threaded shaft 21 or its external threading 22, respectively, can be lightly conically tapered.

An internal threading 24 serves for attaching further force-transferring parts.

An internal threading 33 in a flange 32 of the outer part 30 engages the external threading 22 on the threaded shaft 21. This is of advantage when assembling the force-introducing elements E. After the supporting sleeves 31 have been screw-connected with the tube ends 11 and 12, it is only necessary to screw the inner parts 20 first into the outer parts 30 and then further into tube ends 11 and 12, respectively. In doing so, the required torques can be applied directly to the two parts of the force-introducing element, so that the tube itself is not subjected to any torque. In this connecting system that share of the longitudinal forces which is to be taken up by the supporting sleeve is also transferred to the threaded shaft.

The illustrated tension-compression, preferably two-force, stay affords, when compared with known constructions, a very rigid force-locking effect which is capable of transferring even torques and bending moments up to a certain degree. It is completely free from problems that could be caused by temperature changes in the known constructions, and is of particularly simple manufacture, especially since it is not necessary to observe any narrow tolerances, in view of the clamping effect of the threading.

It will be understood that, in the case of lesser demands of stability, the external part 30 of the force-introducing element E can be omitted. It is also possible to reinforce the tube ends 11 and 12 in another manner, for instance, by increased wall thickness in the region of engagement by the threaded shaft 21.

What is claimed is:

1. A tension-compression stay comprising a synthetic resin tubular strut, having two opposing ends and inner and outer walls, reinforced by fibers of high rigidity, and, at each of the two opposite ends of said strut, a force-introducing element of metal fastened to the respective end and comprising a metallic thread-bearing shaft having an external threading, said force-introducing elements being screwed directly into the ends of said synthetic resin tube by means of the threading of said shaft cutting into the inner wall of the tube ends.

2. The stay of claim 1, wherein said thread-bearing shaft is so dimensioned that the force-transfer from said force-introducing elements to said strut takes place essentially by a force-locking effect.

3. The stay of claim 2, wherein said force-locking effect is frictional.

4. The stay of claim 2, wherein each of said thread-bearing shafts is shaped as a bushing and has an internal threading.

5. The stay of claim 2, wherein each of said force-introducing elements comprises a supporting sleeve adapted for being force-seated in a respective end of said strut.

6. The stay of claim 2, wherein each of said force-introducing elements comprises a supporting sleeve adapted for being force-seated in a respective end of said strut, and each of said supporting sleeves comprises a radially inwardly projecting flange having an internal threading, said flange being screw-connected with said shaft by means of said internal threading.

7. The stay of claim 2, wherein each of said force-introducing elements comprises a supporting sleeve adapted for being force-seated in a respective end of said strut, said supporting sleeves are seated at the ends of said strut with at least one of radial and circumferential tensioning, and each of said thread-bearing shafts is shaped as a bushing and has an internal threading.

8. The stay of claim 2, wherein each of said force-introducing elements comprises a supporting sleeve adapted for being force-seated in a respective end of said strut, and each of said supporting sleeves comprises a radially inwardly projecting flange having an internal threading, said flange being screw-connected with said shaft by means of said internal threading, said supporting sleeves are seated at the ends of said strut with at least one of radial and circumferential tensioning, and each of said thread-bearing shafts is shaped as a bushing and has an internal threading.

9. The stay of claim 2, wherein at least one of said thread-bearing shaft and said external threading thereof is slightly conically tapered.

10. The stay of claim 9, wherein each of said thread-bearing shafts is shaped as a bushing and has an internal threading.

11. The stay of claim 1, wherein each of said force-introducing elements comprises a supporting sleeve adapted for being force-seated in a respective end of said strut.

12. The stay of claim 11, wherein each of said thread-bearing shafts is shaped as a bushing and has an internal threading.

13. The stay of claim 11, wherein said supporting sleeves are connected with the respective thread-bearing shafts associated therewith mechanically or by gluing.

14. The stay of claim 11, wherein said supporting sleeves are seated at the ends of said strut with at least one of radial and circumferential tensioning.

15. The stay of claim 11, wherein each of said thread-bearing shafts is shaped as a bushing and has an internal threading.

16. The stay of claim 11, wherein each of said supporting sleeves comprises a radially inwardly projecting flange having an internal threading, said flange being screw-connected with said shaft by means of said internal threading.

17. The stay of claim 16, wherein each of said thread-bearing shafts is shaped as a bushing and has an internal threading.

18. The stay of claim 16, wherein said supporting sleeves are seated at the ends of said strut with at least one of radial and circumferential tensioning.

19. The stay of claim 18, wherein each of said thread-bearing shafts is shaped as a bushing and has an internal threading.

20. The stay of claim 1, wherein each of said thread-bearing shafts is shaped as a bushing and has an internal threading.

* * * * *